(12) United States Patent
Reial

(10) Patent No.: US 8,315,342 B2
(45) Date of Patent: Nov. 20, 2012

(54) METHOD AND APPARATUS FOR SIMPLIFIED EXPECTED SYMBOL VALUE COMPUTATION AND INTERFERENCE CANCELLATION IN COMMUNICATION SIGNAL PROCESSING

(75) Inventor: Andres Reial, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1070 days.

(21) Appl. No.: 12/252,860

(22) Filed: Oct. 16, 2008

(65) Prior Publication Data

US 2010/0098194 A1 Apr. 22, 2010

(51) Int. Cl.
*H04L 27/06* (2006.01)
(52) U.S. Cl. .......................... 375/342; 375/340; 714/709
(58) Field of Classification Search .................. 375/340, 375/342; 714/709
See application file for complete search history.

(56) References Cited

U.S. PATENT DOCUMENTS

| | | |
|---|---|---|
| 6,677,865 B1 | 1/2004 | Xu |
| 6,944,245 B2 | 9/2005 | Stewart et al. |
| 7,231,005 B2 | 6/2007 | Eidson et al. |
| 7,248,647 B2 | 7/2007 | Claussen et al. |
| 2002/0007257 A1 | 1/2002 | Riess et al. |
| 2004/0037380 A1 | 2/2004 | Shan |
| 2005/0074067 A1* | 4/2005 | Nieto et al. ................. 375/260 |
| 2006/0227854 A1 | 10/2006 | McCloud et al. |
| 2007/0201577 A1 | 8/2007 | Vasil'evich et al. |
| 2007/0253503 A1* | 11/2007 | Kim et al. ..................... 375/265 |
| 2007/0263704 A1 | 11/2007 | Nagarajan et al. |
| 2008/0109701 A1 | 5/2008 | Yu et al. |
| 2009/0132897 A1* | 5/2009 | Xu et al. ....................... 714/796 |

FOREIGN PATENT DOCUMENTS

WO 02/098090 A1 12/2002

OTHER PUBLICATIONS

Kaiser et al., "Multi-Carrier CDMA with Iterative Decoding and Soft-Interference Cancellation," Global Telecommunications Conference—Globecom '97, Phoenix, Arizona, Nov. 3-8, 1997, pp. 6-10, IEEE, New York, NY, US.
Saadani et al., "An Hybrid PIC Based Receiver Using Code Estimation for HSDPA Multiuser Interference Cancellation," 16th International Symposium on Personal, Indoor and Mobile Radio Communications—PIMRC 2005, Berlin, Germany, Sep. 11-14, 2005, pp. 2400-2404, IEEE, Piscataway, NJ, US.

(Continued)

*Primary Examiner* — Eva Puente
*Assistant Examiner* — Leila Malek
(74) *Attorney, Agent, or Firm* — Coats & Bennett, P.L.L.C.

(57) ABSTRACT

A computationally-simplified approach to expected symbol value determination is based on classifying soft bit information corresponding to symbols in a received communication signal as being reliable or unreliable, and computing expected symbol values for the symbols based on the classified soft bit information. Classification can be carried out by "quantizing" the soft bit information to coarsely indicate whether individual symbol bits are known with high or low probability. Using quantized soft bit information greatly simplifies expected symbol value calculation, yet the calculated values still reflect a scaling corresponding to the underlying reliability of the soft bit information. Where the expected symbol values are computed for interfering symbols in a composite signal that also includes desired signals, preserving the underlying reliability knowledge in this manner effectively scales the amount interference cancellation applied to the composite signal in dependence on the reliability to which the interfering signal values are known.

29 Claims, 9 Drawing Sheets

OTHER PUBLICATIONS

Bittner, S. et al. "Low Complexity Soft Interference Cancellation for MIMO-Systems." 2006 IEEE Vehicular Technology Conference (VTC Spring), vol. 4, May 2006, pp. 1993-1997.

Wang, L. et al. "Apriori-LLR-Threshold-Assisted K-Best Sphere Detection for MIMO Channels." 2008 IEEE Vehicular Technology Conference (VTC Spring), May 2008, pp. 867-871.

Boronka, AI. et al. "Improving MIMO Detection by L-Value Analysis and Adaptive Threshold-Based Cancellation." 2003 IEEE Global Telecommunications Conference (GLOBECOM), vol. 4, Dec. 2003, pp. 2099-2103.

Zhuang, X. et al. "Selective Successive Cancellation for Decoding MIMO-OFDM Transmission." 2004 IEEE International Conference on Communications (ICC), vol. 1, Jun. 2004, pp. 259-263.

Khattak, S. et al. "SIC Based Multi-user Turbo Detector for Non Gray Mapping in Distributed Antenna Systems." Technische Universität Dresden, Dresden Germany, 2006. Available at: http://wwwmns.ifn.et.tu-dresden.de/publications/2006/Khattak_S_WPMC_06.pdf.

Kamuf, M. et al. "Parity Bit Soft Estimation Method and Apparatus." Co-pending U.S. Appl. No. 12/245,963, filed Oct. 6, 2008.

* cited by examiner ously are known with high or low probability. Using quantized soft bit information greatly simplifies expected symbol value calculation, yet the calculated values still reflect a scaling corresponding to the underlying reliability of the soft bit information. Where the expected symbol values are computed for interfering symbols in a composite signal that also includes desired signals, preserving the underlying reliability knowledge in this manner effectively scales the amount of interference cancellation applied to the composite signal in dependence on the reliability to which the interfering signal values are known, e.g., interference cancellation scales as a function of received signal quality.

METHOD AND APPARATUS FOR SIMPLIFIED EXPECTED SYMBOL VALUE COMPUTATION AND INTERFERENCE CANCELLATION IN COMMUNICATION SIGNAL PROCESSING

TECHNICAL FIELD

The present invention generally relates to communication signal processing, and particularly relates to a simplified method of computing expected symbol values, such as may be used for canceling interference arising from interfering symbols in a composite signal.

BACKGROUND

In wireless communications systems, different signals often share the same propagation resources. Different communication systems provide various mechanisms for separating signals (e.g., in the time, frequency, or code domain), but separation seldom is perfect because of transmission synchronization errors, Doppler spread or dispersion in the channel, etc. Further, with multiple-input-multiple-output (MIMO) systems, multiple data streams are transmitted to the same user over the same resource space, so that the signal separation relies only on propagation channel differences for the different transmit/receive antenna pairs. Even where MIMO pre-coding is used to improve separation between the data streams, the signals typically are significantly coupled at the receiver.

In all of these cases, the different user signals or the multiple streams interfere with each other at the receiver. The receiver may be understood as receiving a composite signal, including any number of component signals. One or more component signals generally are of interest to the receiver, but the recovery of any given signal of interest is complicated by interference caused by the remaining signals.

A known approach to interference cancellation depends on the detection of interfering signals with the same processing complexity used to detect the desired signal(s). This approach applies full-complexity demodulation and decoding to the interfering signals, including soft value processing. Accurate determination of the interfering signals allows correspondingly accurate reconstruction of the interfering signals for interference cancellation. Full processing of interfering and desired signals, however, imposes a significant signal processing burden on the receiver and makes the approach not feasible or at least undesirable for low-complexity receivers.

Alternatively, full interferer decoding can be avoided by using expected value processing to calculate expected values for interfering symbols. However, calculating the mathematically "exact" expected value for an interfering symbol requires a significant number of computations. For example, for an "L-QAM" constellation, L symbol probabilities $P_l$ need to be computed, each consisting of $\log_2 L$ products, and the expected symbol value $\hat{s}_l$ is produced by performing L multiply-and-accumulate (MAC) operations.

SUMMARY

A computationally-simplified approach to expected symbol value determination is based on classifying soft bit information corresponding to symbols in a received communication signal as being reliable or unreliable, and computing expected symbol values for the symbols based on the classified soft bit information. Classification can be carried out by "quantizing" the soft bit information to coarsely indicate whether individual symbol bits are known with high or low probability. Using quantized soft bit information greatly simplifies expected symbol value calculation, yet the calculated values still reflect a scaling corresponding to the underlying reliability of the soft bit information. Where the expected symbol values are computed for interfering symbols in a composite signal that also includes desired signals, preserving the underlying reliability knowledge in this manner effectively scales the amount of interference cancellation applied to the composite signal in dependence on the reliability to which the interfering signal values are known, e.g., interference cancellation scales as a function of received signal quality.

Accordingly, one embodiment presented herein is a method of computing expected symbol values for one or more symbols in a received communication signal, where the symbols correspond to a predetermined constellation of candidate symbols. The method includes generating soft bit information for individual bits of each such symbol, and classifying the soft bit information for each bit of each such symbol as being reliable or unreliable. The method further includes computing an expected symbol value for each symbol that has reliable soft bit information for at least one of its bits by summing those candidate symbols whose relevant bit values agree with the reliable soft bit information, and scaling the sum by a scaling factor proportional to the number of bits in the symbol that have reliable soft bit information.

As noted, in one or more embodiments, the received communication signal is a composite signal that includes interfering symbols and desired symbols, and the method includes interference cancellation wherein expected symbol values are computed for the interfering symbols and subtracted from the composite signal to obtain a reduced-interference signal. Still further, the method in such embodiments includes detecting desired symbols from the reduced-interference signal.

In another disclosed embodiment, a wireless communication receiver includes one or more processing circuits configured to generate soft bit information for individual bits of one or more symbols in a received communication signal, where such symbols correspond to a predetermined constellation of candidate symbols, i.e., each transmitted signal was generated as a respective one of the candidate symbols in the constellation. The one or more processing circuits are configured to classify the soft bit information for each bit of each such symbol as being reliable or unreliable, such as described above. Further, the one or more processing circuits are configured to compute an expected symbol value for each symbol that has reliable soft bit information for at least one of its bits by summing those candidate symbols whose relevant bit values agree with the reliable soft bit information, and scaling the sum by a scaling factor proportional to the number of bits in the symbol that have reliable soft bit information.

In one or more embodiments, the received communication signal is a composite signal that includes interfering symbols and desired symbols, and the one or more processing circuits are configured to cancel interfering symbol interference with respect to the desired symbols by computing expected symbol values for the interfering symbols in accordance with the above described method, and subtracting the expected symbol values from the composite signal to obtain a reduced-interference signal. The one or more processing circuits in such embodiments are further configured to detect desired symbols from the reduced-interference signal.

However, the present invention is not limited to the above summary of features and advantages. Indeed, those skilled in

DETAILED DESCRIPTION

Figure 1:
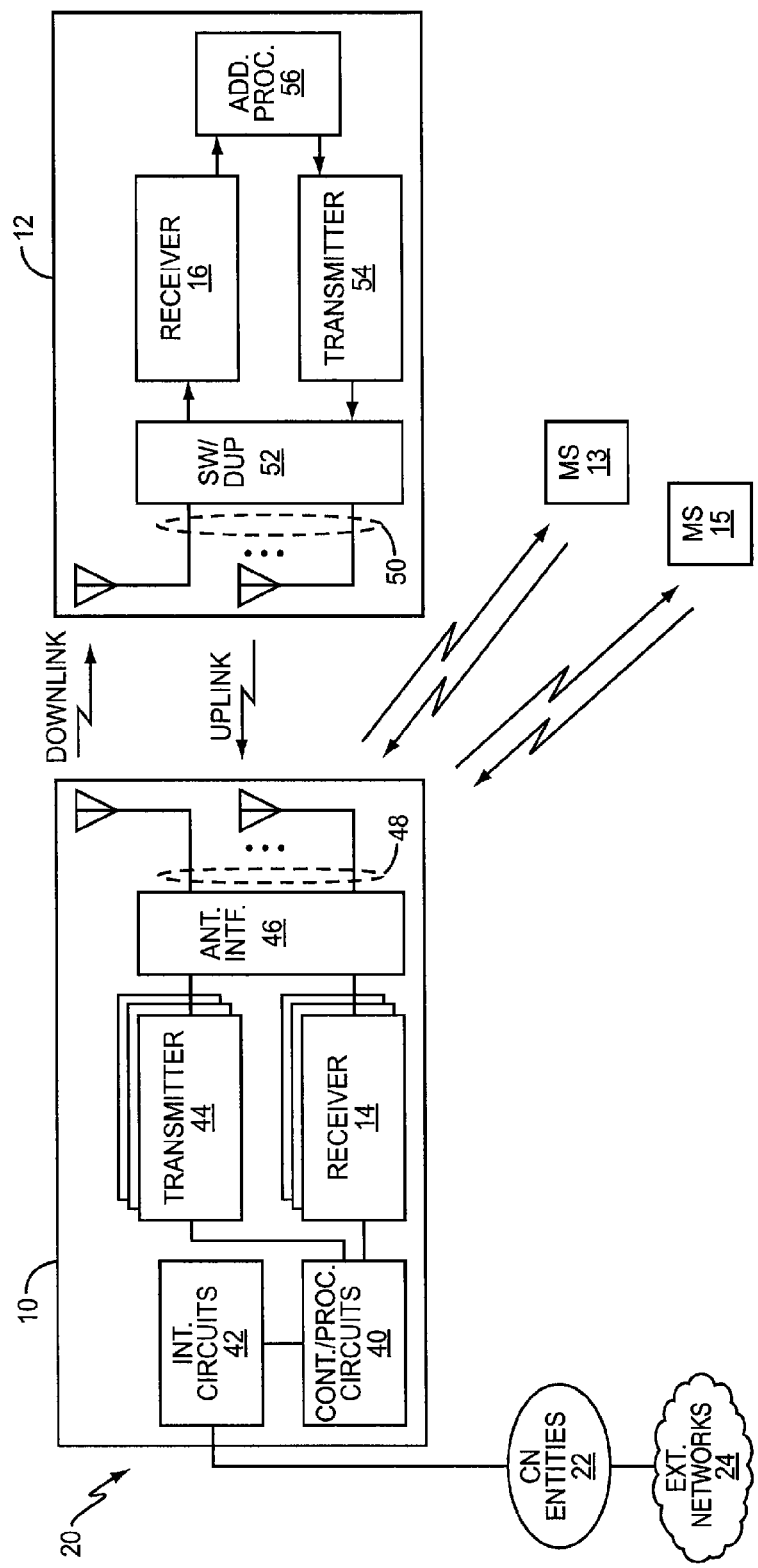
FIG. 1 is block diagram of one embodiment of a wireless communication network, wherein the illustrated base station and/or mobile stations include a receiver configured according to an expected symbol value computation method presented herein.

FIG. 1 illustrates one embodiment of a base station 10 that transmits downlink signals to a mobile station 12, and receives uplink signals from the mobile station 12. The base station 10 includes a wireless communication receiver 14 for processing uplink signals received from the mobile station 12. Likewise, the mobile station 12 includes a wireless communication receiver 16 for processing downlink signals received from the base station 10. The base station 10 and mobile station 12 are configured for operation in a Wideband-CDMA (WCDMA) network in one embodiment and for Long Term Evolution (LTE) operation (with or without MIMO) in another embodiment, but these should be understood as non-limiting examples. It also should be understood the base station 10 may support potentially many other mobile stations, e.g., mobile stations 13, 15, etc.

According to the teachings presented herein, one or both of the receivers 14 and 16 are configured to carry out a "simplified" method of expected symbol value computation. Here, "simplified" denotes that the method of expected value computation presented herein is less complex computationally than a "full" exact expected value computation. With a traditional, mathematically exact expected value computation, an expected symbol value is computed as the probability-weighted sum of per-symbol probabilities, where a per-symbol probability is computed for each candidate symbol value in the associated modulation constellation. In turn, each per-symbol probability is computed as the product of per-bit probabilities, computed for each defined bit position in the candidate symbols. In contrast, the proposed simplified method of expected symbol value computation effectively ignores unreliable soft bit value information.

In particular, the method generates soft bit information for each bit in each of one or more symbols in a received communication signal, and classifies that soft bit information as "reliable" or as "unreliable." The method continues with using the classified soft bit information to calculate expected symbol values for the one or more symbols. Use of the classified soft bit information preserves the reliable/unreliable indication for individual bits in the symbols but effectively discards the more nuanced confidence indication provided by full-range soft value information. The use of classified soft bit information, e.g., quantized soft bit values, greatly reduces the number and complexity of computations needed for expected value determination as compared to carrying out the full-complexity, mathematically exact expected value processing using full-range soft bit information.

As will be seen throughout this disclosure, the received communication signal may be a "composite signal" that includes interfering symbols and desired symbols. (Here, the received communication signal may be the initial baseband version of one or more antenna-received signals, or it may be an intermediate signal anywhere in a receiver processing chain, such as the stage input signal in a parallel or successive interference cancellation receiver circuit.) In any case, an advantageous but non-limiting embodiment uses this disclosure's simplified expected symbol value computation to estimate expected symbol values for the interfering symbols, and to cancel interfering symbol interference in the composite signal by subtracting the expected symbol values from the composite signal. In such processing, desired symbols are detected from the reduced-interference signal obtained by the subtraction.

A particular advantage of using simplified expected symbol value computation for interference cancellation is that the computational complexity is greatly reduced, as compared to using mathematically exact expected value computation, yet the expected symbol values still scale as a function of the reliability of the underlying soft bit value information. In other words, the reduced-complexity expected value processing presented herein still provides for interference cancellation that scales or otherwise adapts to changing soft bit information reliability, such that the amount or extent of interference cancellation applied varies in dependence on the reliability of the underlying soft bit information. For example, in at least one embodiment, the amount of interference cancellation applied for a given interfering symbol depends on the number of bits that are deemed to be reliably known for that symbol.

In an extreme case, no interference cancellation is applied for interfering symbols having no reliable soft bit information. Thus, interference cancellation as taught herein advantageously operates over an entire signal quality operating range (e.g., the entire signal-to-interference ratio or SIR range of a received composite signal), without need for complex heuristic mechanisms to turn interference cancellation on and off.

However, those skilled in the art will immediately appreciate that the computational simplifications of the expected symbol value computation method presented herein are advantageous in any application where expected symbol values are needed or desired. Interference cancellation as described herein is a non-limiting example. Further, those skilled in the art will appreciate that the receiver teachings presented herein are independent of the communication standards at issue, e.g., independent of any particular radio access technology. Thus, top-level architectural details for communication networks, base stations, mobile stations, etc. are not needed for understanding the receiver teachings herein; however, non-limiting examples of such details are helpful in establishing a context for discussion.

To that end, and returning to the example illustration of FIG. 1, one sees that the base station 10 comprises part of a wireless communication network 20, which also includes one or more additional core network (CN) entities 22 communicatively coupling the network 20 to one or more external networks 24, e.g., the Internet, PSTN, and/or other communication networks. The base station 10 thus communicatively couples mobile stations to each other and/or to other communication networks by transmitting downlink signals to them and receiving uplink signals from them.

In support of these functions, the base station 10 includes call control and processing circuits 40, interface circuits 42, the aforementioned receiver 14, which may comprise a portion of overall receiver circuitry in the base station 10, one or more transmitters 44, an antenna interface 46, and one or more transmit/receive antennas 48. In one embodiment, the base station 10 comprises a multiple-input-multiple-output (MIMO) base station and thus uses the antennas 48 for transmitting multiple streams to one or more users (mobile stations). In at least one MIMO embodiment, the transmitter(s) 44 includes pre-coding circuits, which apply pre-coding matrices to the multiple streams being transmitted, corresponding to desired per-antenna transmit power weightings for the different MIMO streams.

In such embodiments, one or more of the mobile stations 12, 13, and 15 are configured for MIMO operation, although non-MIMO embodiments are contemplated herein. With the mobile station 12 as an illustrated example, one sees that it includes one or more transmit/receive antennas 50, antenna interface circuits 52 (e.g., a switch and/or duplexer), the aforementioned receiver 16, a transmitter 54, and additional processing circuits 56, which may include one or more microprocessors for controlling operation of the mobile station, and one or more interface circuits for user interaction with the mobile station.

Figure 2:
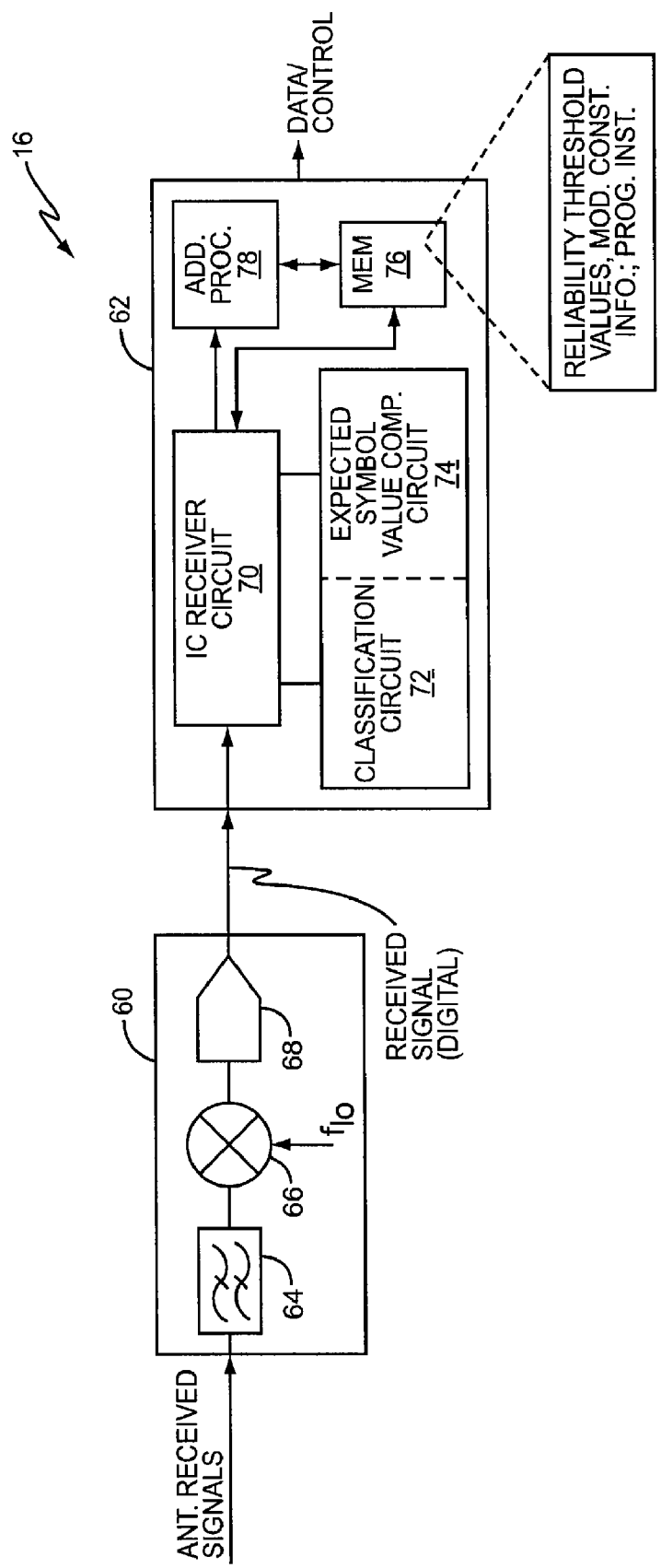
FIG. 2 is a block diagram of one embodiment of a mobile station receiver configured according to an expected symbol value computation method presented herein.

Continuing with the example of mobile station 12, one sees in FIG. 2 that in at least one embodiment the receiver 16 comprises a receiver front-end 60 and one or more processing circuits 62, referred to herein as a "baseband processor." The receiver front-end 60 processes antenna-received signals, e.g., a received composite signal including one or more component signals received on one or more of the mobile station's antennas. In one embodiment, such processing includes filtering/gain control 64, down-conversion 66, and digitization 68. The baseband processor 62 therefore receives one or more streams of digital samples corresponding to the time-varying antenna-received signals.

In at least one embodiment, the digital sample stream(s) input to the baseband processor 62 comprise in-phase (I) and quadrature (Q) sample streams for one or more signals. Those skilled in the art will appreciate that the received composite signal may be a combination of MIMO information streams, and these information streams should not be confused with the digitized sample streams, which themselves may include digital samples representing more than one MIMO information stream. Broadly, it should be understood that in one or more embodiments the input digital samples are a composite of more than one signal, one or more of which constitute "desired signals" and the remaining ones constituting "interfering signals." More particularly, a given signal may be a desired signal but it still represents interference with respect to the detection of another desired signal. With that point in mind, the receiver 16 includes one or more processing circuits that are configured to perform interference cancellation for each of one or more desired signals included in a received composite signal.

Although other arrangements are contemplated for processing received signals, the illustrated embodiment depicts the one or more processing circuits as a baseband processor 62 that includes an interference-canceling (IC) receiver circuit 70. The IC receiver circuit 70 includes or is associated with a classification circuit 72, an expected symbol value computation circuit 74, and memory 76. Memory 76 may comprise more than one device and/or more than one type of memory. For example, the baseband processor 62 may include or otherwise have access to volatile memory (cache and/or off-chip) for working computations and data, and have access to one or more types of non-volatile memory for storing computer program instructions, configuration data, lookup tables, etc., such as FLASH and/or EEPROM memory. The baseband processor 62 also may include additional processing circuits 78, such as receiver/transmitter, control and signaling circuits. In any case, in one or more embodiments the memory 76 stores one or more defined reliability thresholds for use in classifying soft bit information as reliable or unreliable, modulation constellation information for one or more predetermined modulation constellations, and computer program instructions implementing all or part of the method(s) taught herein for interference cancellation.

It will be understood that execution of the stored computer program instructions configures the receiver 16 for operation according to the method teachings presented herein. In support of this execution and resultant processing, the baseband processor 62 in one or more embodiments comprises a general or special-purpose microprocessor or digital signal processor. Of course, in one or more embodiments, at least some of the received signal processing of interest herein may be performed at least in part using hardware-based circuits.

With the above example details in mind, one or more embodiments of the receiver 16 and/or the receiver 14 are configured to perform interference cancellation based on a simplified approach to calculating expected symbol values for interfering symbols. The expected symbol values to be subtracted are computed after applying a threshold operation to soft bit information generated for the interfering symbols, e.g., per-bit log-likelihood ratios. The soft bit information for each bit in an interfering symbol is classified as being reliable or unreliable. To simplify expected symbol value calculation, reliable bits are treated as "certain" and the information from unreliable bits is ignored.

The receiver 16 can carry out such processing irrespective of whether the soft bit information is obtained from a decoding process, wherein the soft bit information for the interfering symbols is determined after or in conjunction with decoding the interfering symbols, or from a pre-decoding process, wherein the soft bit information for the interfering symbols is determined in advance of any decoding processing performed on the interfering symbols. Indeed, interference cancellation as taught herein does not require that the interfering symbols actually be decoded, although they may be (e.g., in a multi-stream MIMO context).

Figure 3:
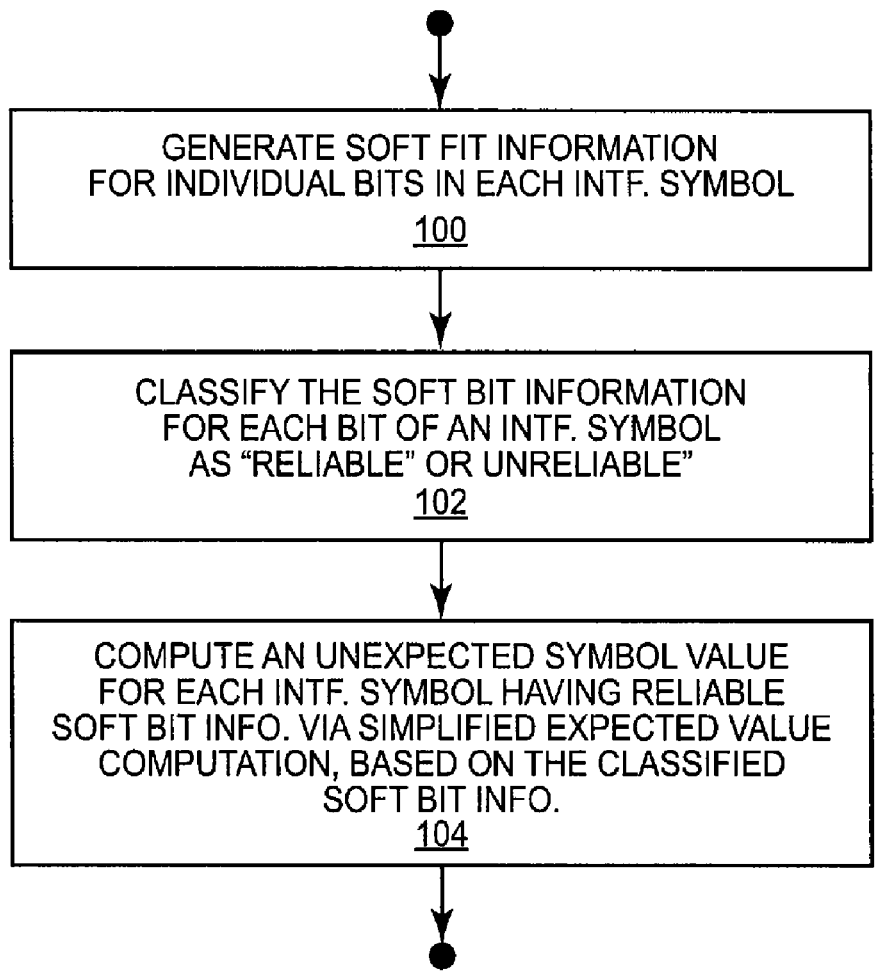
FIG. 3 is a logic flow diagram of one embodiment of a method for carrying out an expected symbol value computation method presented herein.

Continuing with the receiver 16 as a non-limiting example of a wireless communication receiver, the receiver 16 is configured in one or more embodiments to implement a method of simplified expected symbol value computation. That is, the receiver 16 is configured according to the teachings herein, for reduced-complexity computation of expected symbol values for one or more symbols in a received communication signal. FIG. 3 illustrates one embodiment of the method.

The illustrated processing "begins" with generating soft bit information for individual bits in each of one or more received symbols in a received communication signal (Block 100) and classifying the soft bit information for each bit of each such symbol as being reliable or unreliable (Block 102). Processing continues with computing an expected symbol value for each such symbol that has reliable soft bit information for at least one of its bits (Block 104). The expected value computation is carried out by summing those candidate symbols whose relevant bit values agree with the reliable soft bit information, and scaling the sum by a scaling factor proportional to the number of bits in the symbol that have reliable soft bit information. In one embodiment, the scaling factor is determined as $2^m/L$, where "m" is an integer equaling the number of bits in the symbol that have reliable soft bit information, and "L" is an integer equaling the number of candidate symbols in the predetermined modulation constellation.

Figure 4:
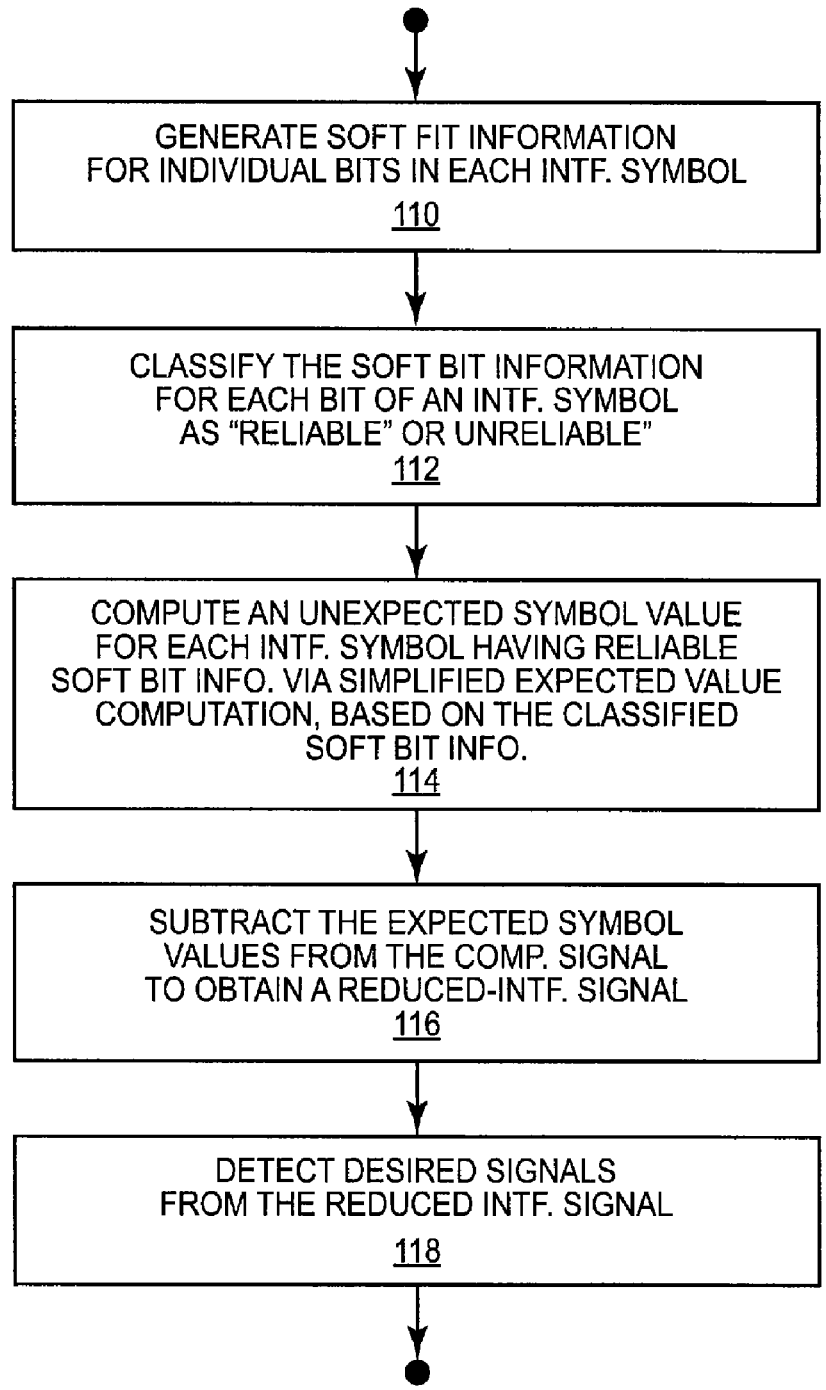
FIG. 4 is a logic flow diagram of one embodiment of a method for carrying out interference cancellation based on an expected symbol value computation method presented herein.

FIG. 4 illustrates the advantageous use of the above simplified expected symbol value computation for interference cancellation. The initial processing steps (110, 112, 114) in FIG. 4 mirror those introduced in FIG. 3 (100, 102, 104). Here, the simplified method of expected symbol value processing is advantageously used to compute expected symbol values for one or more interfering symbols in a received composite signal that includes interfering and desired symbols. (In a signal with multiple symbol streams, the other symbol streams can be considered as interfering symbols with respect to any given stream of interest.) FIG. 4 thus generates soft bit information for interfering symbol bits, classifies that information as reliable or unreliable, and then uses that classified information to simplify computation of expected symbol values for interfering symbols.

With the above estimations, the illustrated processing in FIG. 4 continues with subtracting the expected symbol values from the composite signal to obtain a reduced-interference signal (Block 116). Desired symbols are then detected from the reduced-interference signal (Block 118).

Those skilled in the art will appreciate that the method of FIGS. 3 and 4 can be implemented in hardware or software, or a combination thereof, and that the actual order of processing may differ from that shown in the illustration, and that at least some aspects of the illustrated processing may be performed in conjunction with other receiver operations. Further, the illustrated processing may be looped or otherwise repeated for successive blocks of received symbols. Further, with respect to FIG. 4, the illustrated processing can be applied on a per-stage basis in a parallel interference cancellation receiver embodiment of the receiver 16, or applied on a per-stage basis in a successive interference cancellation embodiment of the receiver 16. For these per-stage embodiments, the composite signal may differ on a per-stage basis, and/or the interfering/desired signals may change on a per-stage basis.

The illustrated interference cancellation in FIG. 4 also may be extended to include setting the expected symbol value to zero for any given interfering symbol that has no reliable soft bit information, such that interference cancellation is nil for the given interfering symbol. With this variation, the simplified expected value computation is performed for each interfering symbol that has reliable soft bit information for at least one of its bits, while the computation is skipped or otherwise set to a zero value for any interfering symbol having only unreliable soft bit information.

In the same or other embodiments of the methods shown in FIGS. 3 and 4, generating soft bit information for individual bits of each symbol comprises generating a bit log-likelihood ratio for each bit of the interfering symbol. The bit log-likelihood ratio is defined, for example, as the (natural) log of the ratio of the probability that a given bit is one to the probability that the given bit is a zero. Thus, if a given bit is strongly detected as a "1," its bit log-likelihood ratio is a positive number with large magnitude, whereas a given bit strongly detected as a "0" will have a bit log-likelihood that is a negative number with large magnitude. More weakly detected 1s and 0s have correspondingly smaller positive and negative values. The criterion for "large" may depend on the receiver configuration. In one possible example embodiment, 1.0 may be used as the magnitude criterion.

Thus, in one or more embodiments of the method, classifying the soft bit information for each bit of a symbol as being reliable or unreliable comprises comparing a magnitude of the bit log-likelihood ratio to a defined reliability threshold and correspondingly classifying the bit log-likelihood ratio as unreliable if its magnitude is below the defined reliability threshold and reliable if its magnitude is above the defined reliability threshold. The reliability threshold thus may be a specific numeric value, and its actual value may be made to depend on or otherwise derive from one or more characteristics of the modulation constellation associated with the interfering symbols.

For example, given that the summing and scaling processing described above for Block 104/114 in FIG. 3/4 represents a simplified calculation of expected value as compared to an exact expected value calculation that uses probability-weighted sums of all candidate symbols in the predetermined modulation constellation, the defined threshold may be set to a numeric value that makes the results produced by the simplified calculation as close as practicable to the results that would be obtained using the full-complexity exact calculation.

The reliability threshold, τ, may be determined in different ways. For example, a value minimizing the expected deviation from the exact expected symbol value may be chosen according to:

$$\tau = \arg\min E|\hat{s}-\tilde{s}|^2, \qquad \text{Eq. (1)}$$

where $\hat{s}$ is the exact expected symbol value and the simplified expected symbol value computed as taught herein using classified soft bit information. A value for τ may be determined according to Eq. (1) by performing the full-complexity and simplified expected value computations for one or more sample symbol sets (hypothesized sets or blocks of interfering symbols). Similarly, in another embodiment, a value for τ yielding the same average estimated symbol power (as between full-complexity and simplified expected value computations) may be chosen as:

$$\tau = \arg\min |E|\hat{s}|^2 - E|\tilde{s}|^2|. \qquad \text{Eq. (2)}$$

The threshold value(s) may be pre-computed off-line. For optimal performance, different values of τ may be chosen for each constellation type, i.e., different numeric values of τ can be used for different interfering symbol modulation constellations. Alternatively, a value providing best performance over a range of scenarios or conditions may be found via performance simulations. For example, setting the value τ in the range of 0.8 . . . 1.3 works very well over a range of conditions and modulation constellations, i.e., results in interference cancellation performance that is comparable to or at least approaches that which would be obtained with full-complexity exact expected symbol value calculations.

Regarding that cancellation performance, those skilled in the art will appreciate that the receiver 16 is configured in one or more embodiments to account for channel propagation effects, e.g., where the interfering symbols are modified by propagation channel effects. Indeed, in the context of the illustrated processing in FIG. 4, it should be understood that the step of subtracting expected symbol values from the composite signal does not necessarily mean that the expected symbol values are subtracted directly from the composite signal without benefit of any further processing. In one or more embodiments, the expected symbol values (as computed for corresponding interfering symbols) are "channelized" (according to the propagation channel estimates) before subtracting them from the composite signal. Channelization comprises, for example, applying estimated propagation channel attenuations and phase shifts to the expected symbol values, to account for the propagation channel effects in the interfering symbols as received at the receiver 16.

Before turning to more detailed examples of the interference cancellation method proposed herein, it may help to detail the conventional, full-complexity approach to expected symbol value computation. After an interfering symbol is demodulated and/or decoded, its individual bit soft values (LLR-s) $\lambda_m$ reflect the reliability of each bit m. (For example, an interfering symbol formed using a 16-QAM modulation constellation has four bits.) Using the log-likelihood ratio information, the full-complexity exact expected symbol value for an interfering symbol may be computed as $$\hat{s} = E[s \mid RX \text{ data}] = \sum_{l=1}^{L} P_l d_l, \quad \text{Eq. (3)}$$

where $$P_l = \prod_{m=1}^{M} p_{l,m}, \quad \text{Eq. (4)}$$

represents the per-symbol probability, $d_l$ are the constellation points, l=1 ... L. Again, using 16-QAM as an example, the modulation constellation includes sixteen candidate symbols, each candidate symbol representing a unique 4-bit value based on the constellation point it occupies in the modulation constellation. Further, $p_{l,m}$ is the probability that the transmitted bit for position m in the interfering symbol equals the m-th bit value of the l-th constellation point, m=1 ... M, and M=$\log_2$ L.

With $P_l$ as the per-symbol probability, i.e., the probability that the interfering symbol is the l-th candidate symbol in the modulation constellation, full-complexity expected value computation requires the computation of a per-bit probability for each bit position. That is, $p_{l,m}$ in Eq. (4) is the probability that the transmitted bit for position m in the interfering symbol equals the m-th bit value of the l-th constellation point. The per-bit probability may be expressed as $$p_{l,m} = \begin{cases} \dfrac{e^{\lambda_m}}{1+e^{\lambda_m}} & b_{l,m} = 1 \\ \dfrac{1}{1+e^{\lambda_m}} & b_{l,m} = 0 \end{cases}, \quad \text{Eq. (5)}$$

where $\lambda_m$ is the log-likelihood ratio for bit m and $b_{l,m}$ is the bit value for constellation point l, bit position m.

These per-bit probabilities must be calculated for each of the M bit positions of the l-th constellation point, to obtain the symbol probability associated with that constellation point, and such a symbol probability must be computed for each of the L constellation points. The computational requirements of the full-complexity, mathematically exact expected symbol computation process therefore is considerable. As an example, doing successive interference decoding for 2×2 MIMO in LTE, where 8400 symbols are handled per slot (0.5 ms), the computational load is given by 2000·8400·(64·6+64) =7.5 Gflops, assuming 64-QAM modulation for the interfering symbols, e.g., symbols in the first MIMO stream are interfering with respect to symbols in the second MIMO stream.

The teachings herein capture or otherwise preserve most of the performance advantages of full-complexity estimated symbol value processing for interference cancellation, while greatly simplifying the required computations. Striking this advantageous balance between performance and computational complexity hinges on the recognition that a communication receiver may retain the reliable/unreliable knowledge provided by soft bit information, while discarding or otherwise ignoring the detailed soft value information. With this point in mind, FIG. 5 illustrates more details for one embodiment of the method introduced by FIG. 3.

Figure 5:
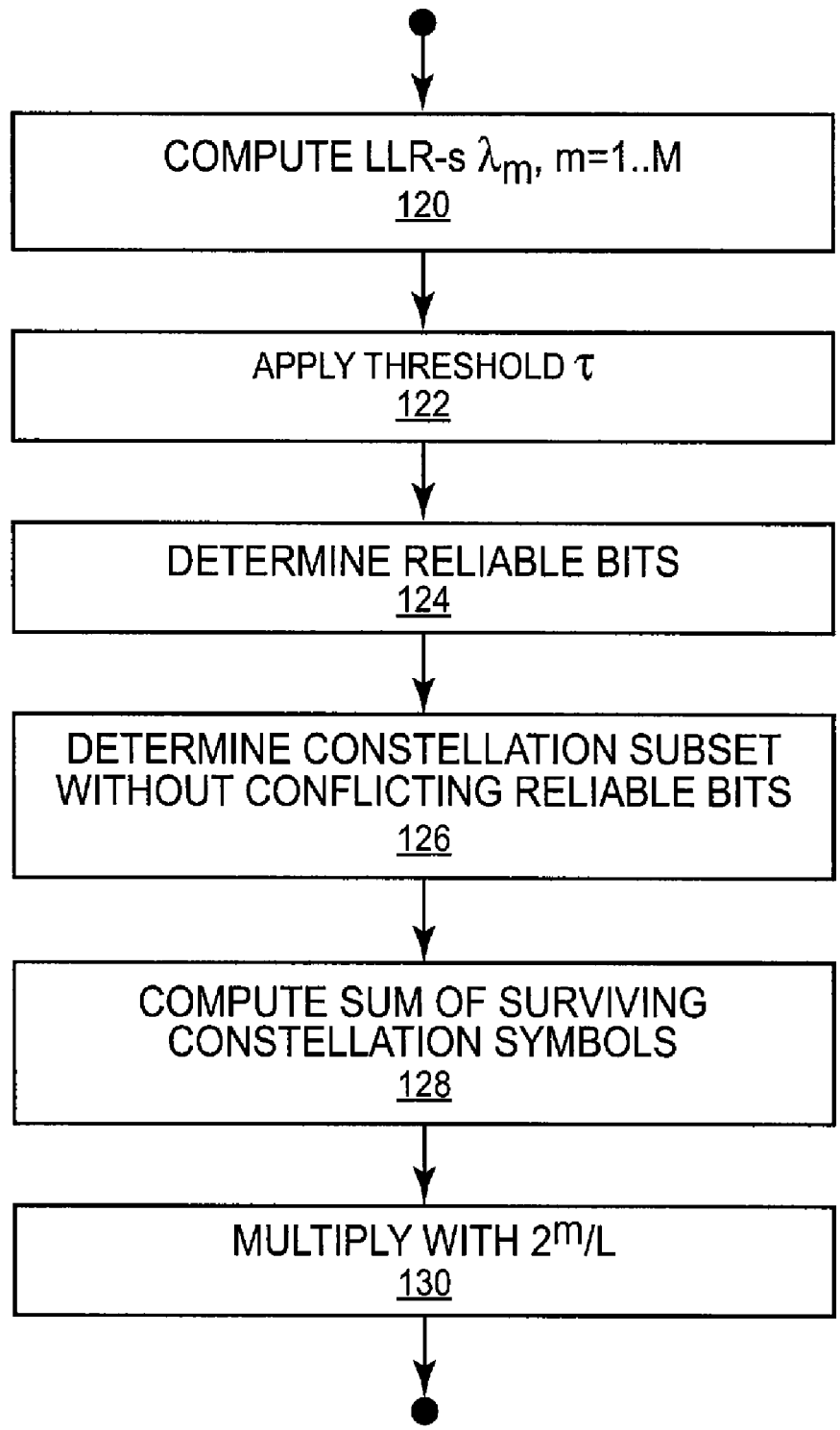
FIG. 5 is a logic flow diagram of another embodiment of a method for carrying out an expected symbol value computation method presented herein.

In FIG. 5, processing includes computing (as soft bit information) the bit log-likelihood ratios for one or more interfering symbols (Block 120). To classify each bit log-likelihood ratio as reliable or unreliable, the one or more processing circuits of the receiver 16 apply a threshold operation to each bit log-likelihood ratio (Block 122). In so doing, the receiver 16 produces a set of low-resolution LLR values. For example, the receiver 16 performs the following thresholding operation:

$$\tilde{\lambda}_k = \begin{cases} Z \cdot \text{sgn } \lambda_k, & |\lambda_k| > \tau \\ 0 & |\lambda_k| \leq \tau \end{cases}, \quad \text{Eq. (6)}$$

where Z is an implementation-dependent "large" value, implying that the bit value is certain, and $\tau$ is the threshold value described later. In operation, Eq. (6) quantizes each original bit log-likelihood ratio into one of two values: zero if the bit value for the corresponding symbol bit was detected with low probability, or Z if the bit value was detected with high probability. As noted, Z is signed corresponding to whether a bit value of 1 of 0 was detected, and the value of Z is large in the sense relevant to "conventional" log-likelihood ratios or otherwise large relevant to whatever scale or range is being used for the underlying soft bit information.

Mathematically, the expected symbol value for a given symbol is computed as $$\tilde{s} = \sum_{l=1}^{L} \tilde{P}_l d_l, \quad \text{Eq. (7)}$$

where the per-symbol probabilities are computed as $$\tilde{P}_l = \prod_{m=1}^{M} \tilde{p}_{l,m}, \quad \text{Eq. (8)}$$

but now $\tilde{p}_{l,m}$ will only take values from the set {0.0, 0.5, 1.0}, because of the truncation (quantizing) applied to the original bit log-likelihoods. (One can better appreciate the reduced probability value set by replacing $\lambda_m$ in Eq. (5) with a large positive value (+Z) for reliably indicated bit values of 1, and with a large negative value (−Z) for reliably indicated bit values of 0.) In other words, the expected symbol value computations are greatly simplified by use of the classified bit log-likelihood ratios.

For example, determining $\breve{P}_l$ no longer requires any multiplications; only the candidate symbols without any per-bit probability $\breve{p}_{l,m}=0$ need to be considered and they all have equal probability. For m reliable bits in any given symbol, i.e., an integer number m of the bits represented by the interfering symbol are classified as reliable, the number of constellation points with non-zero probability is $$\frac{L}{2^m}.$$

The receiver 16 therefore can be configured to compute $$\breve{P}_l = \breve{P} = \frac{2^m}{L}.$$

Therefore, to produce an expected symbol value for a given symbol having reliable soft bit information for at least one of its bits, the receiver 16 simply adds the relevant constellation points and scales the sum:

$$\breve{s} = \breve{P} \sum_{l:\, \breve{p}_{l,m} \neq 0 \forall m} d_l. \qquad \text{Eq. (9)}$$

Figure 6:
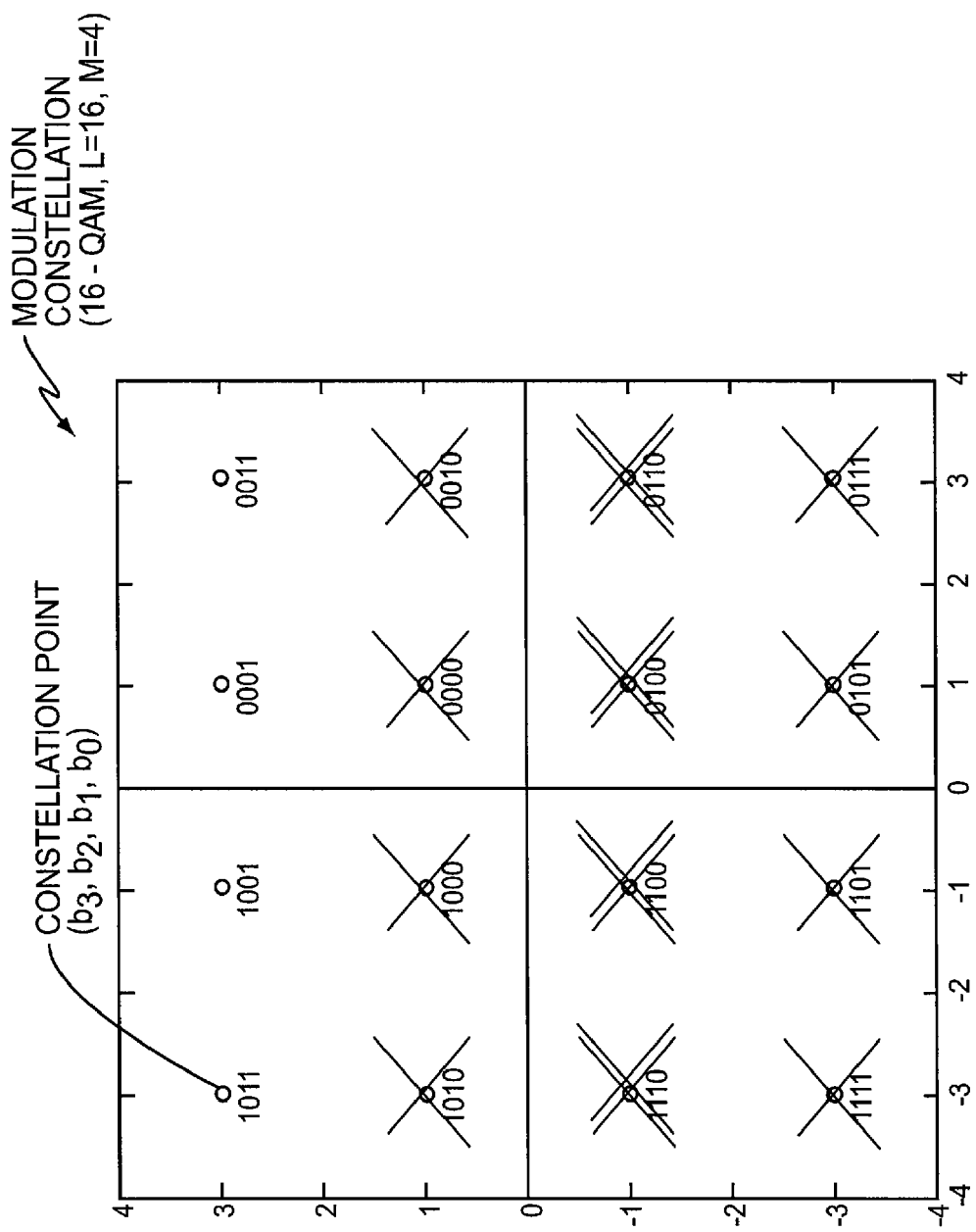
FIG. 6 is a diagram of an example modulation constellation, in which an example subset of constellation points to be considered for simplified expected symbol value estimation is shown.

Referring to the processing of flow of FIG. 3, for example, the above processing can be understood as the receiver 16 determining whether/which soft bit information for a given symbol is reliable (Block 124) and correspondingly determining the subset of constellation points without bit values that conflict with the reliable soft bit information of the symbol (Block 126). Such processing further includes, for each symbol computing the sum of the surviving constellation points, i.e., the receiver 16 sums those candidate symbols in the associated modulation constellation that were not excluded as having relevant bit values that conflicted with the symbol's reliable bit information (Block 128). FIG. 6 depicts the formation of a "surviving" set of constellation points, wherein for the sake of example, it is assumed that a given symbol is associated with 16-QAM, and that the total number of bits-per-symbol M therefore equals 4 and the total number of constellation points (candidate symbols) L therefore equals 16.

To complete the example, it is assumed that bit0 and bit2 of the symbol are associated with soft bit information that has been classified as reliable. More particularly, bit0 is reliably indicated as being a 1 and bit2 is reliably indicated as being a 0. Constellation points having relevant bit values conflicting with one of these reliable bits are marked with one "X" and constellation points having relevant bit values conflicting with both of these reliable bits are marked with two Xs. The unmarked constellation points in the top row of the illustrated modulation constellation have relevant bit values that agree with the symbol's reliable bit information, and the constellation points in this top row would therefore be summed for simplified computation of the expected symbol value. "Adding" constellation points in this manner comprises summing the constellation points in the phase/amplitude sense.

The resulting sum is scaled by $2^m/L$ (Block 130), where L is the number of constellation points (number of candidate symbols) and m is the number of bits in the symbol having reliable soft bit information. Again, for this example, m=2 and L=16.

Advantageously, one sees that the scaling reflects received signal quality and/or other conditions that bear on the reliability of detecting the symbols. As a general proposition, as the received signal quality goes down for the received communication signal, reliable soft bit information would be generated for fewer symbols and/or fewer bits in any given symbol would be reliably detected. Thus, the value of $\breve{P}$ acts as a scaling factor that is sensitive to received signal quality. For interference cancellation embodiments, where the simplified expected value computation is used to compute expected symbol values for interfering symbols, such scaling means that the extent or amount of interference cancellation applied depends on received signal quality.

In the extreme case, if all bits are found to be unreliable for a given interfering symbol, no computation need be carried out and the expected symbol value $\breve{s}$ for that symbol can be set to zero. Such processing prevents the generation and subtraction of interference cancellation values from the composite signal for interfering symbols that have no reliable soft bit information. For the computationally worst-case of one reliable bit in a given symbol, the method presented herein still yields significant reductions in the complexity expected symbol value computation. In comparison to the earlier example of 7.5 Gflops required for exact expected value processing, the method presented herein reduces the worst-case scenario of only one reliable bit to approximately $2000 \cdot 8400 \cdot (64/2+1)$ =0.5 Gflops.

Figure 7:
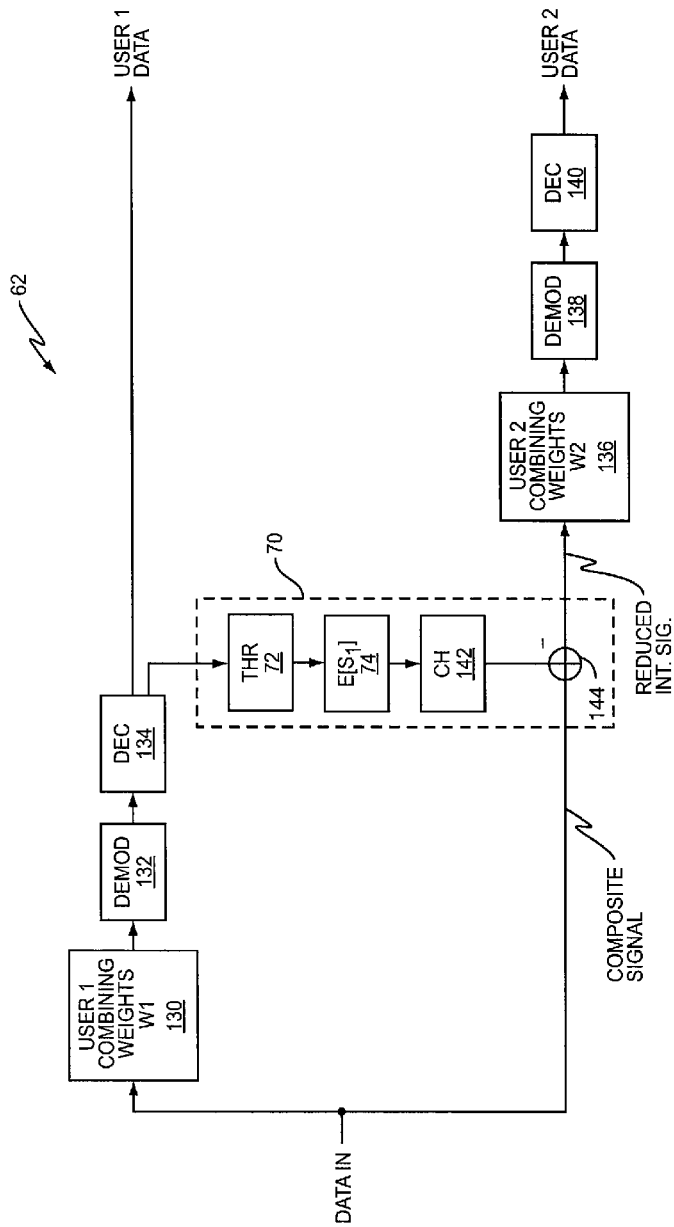
FIG. 7 is a block diagram of another embodiment of a mobile station receiver configured to carry out an expected symbol value computation method presented herein.
Figure 8:
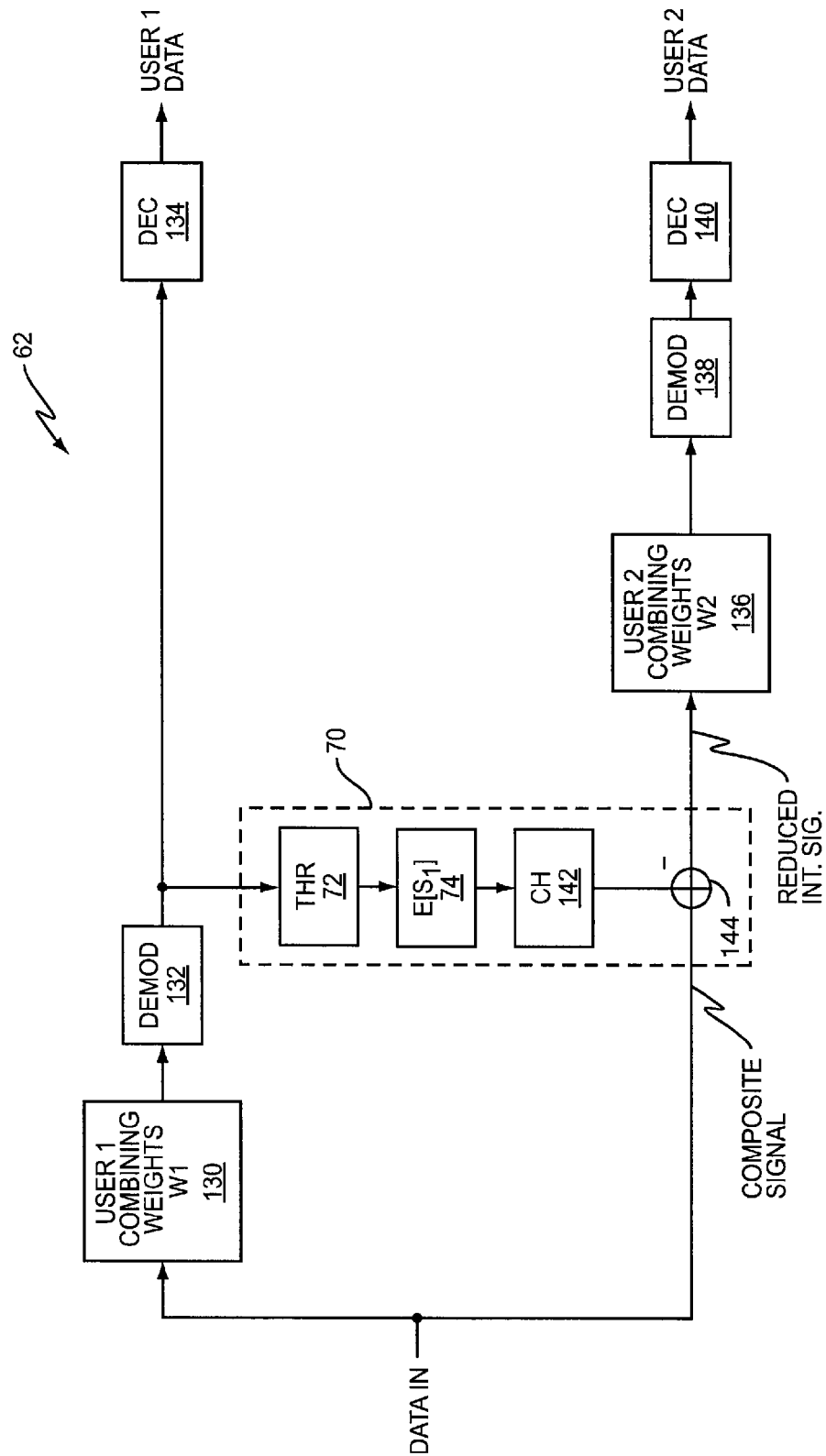
FIG. 8 is a block diagram of another embodiment of a mobile station receiver configured to carry out an expected symbol value computation method presented herein.

Earlier it was mentioned that this advantageous processing complexity reduction was gained independent of whether the soft bit information generated for the interfering symbols was detected before, after, or as part of decoding the interfering symbols, and independent of whether they were decoded at all. FIGS. 7 and 8 illustrate examples of this flexibility.

In FIG. 7, one sees an embodiment of the baseband processor 62 for the receiver 16 where it is implemented as a successive interference cancellation receiver, and where the soft bit information for interfering symbols (the "user 1" symbol stream) is generated after decoding the interfering symbols. (FIG. 8 illustrates an otherwise identical embodiment, but where the soft bit information is obtained before decoding the interfering symbols.)

In particular, the illustrated baseband processor 62 includes a weighting circuit 130 for applying user 1 weighting to the composite signal (data in), a demodulator 132 to demodulate user 1 symbols, and a decoder 134 to decode the demodulated user 1 symbols (e.g., a turbo decoder). The illustrated baseband processor 62 further includes another weighting circuit 136 for applying user 2 weighting to the reduced-interference signal obtained by canceling user 1 symbol interference (at least partly) from the composite signal, a demodulator 138 to demodulate user 2 symbols, and a decoder 140 to decode the demodulated user 2 symbols (e.g., a turbo decoder).

The IC receiver circuit 70 included within the baseband processor 62 here includes the previously described classification circuit 72 and expected symbol value computation circuit 74, and further includes a channelization circuit 142 and a combining circuit 144. In operation, the decoder 134 provides soft bit information for the interfering user 1 symbols to the IC receiver circuit 70. The classification circuit 72 applies thresholding (Thr) to the soft bit information to classify the soft bit information for individual bits of the interfering symbols as being reliable or unreliable. In turn, the expected symbol value computing circuit 74 uses the classified soft bit information to perform simplified computation of expected symbol values for the interfering symbols, and the channelization circuit 142 "channelizes" these expected symbol values for subtraction from the composite signal. The channelization circuit 142 includes or is associated with a channel estimation circuit that performs dynamic or ongoing channel estimation, to maintain reasonably current propagation channel estimates (phase, attenuation) for use in channelizing the expected symbol values.

In turn, the combining circuit 144 combines the (channelized) expected symbol values with the composite signal, e.g., it performs subtractive combining, and provides the resulting reduced-interference signal to the weighting circuit 136, for weighting and subsequent demodulation (detection) of the user 2 symbols. For purposes of this example, then, the baseband processor 62 can be understood as receiving a composite signal including user 1 and user 2 symbol information. For the user 2 receiver path, the user 2 symbols are considered to be the desired symbols, and the user 1 symbols are considered to be the interfering symbols.

Figure 9:
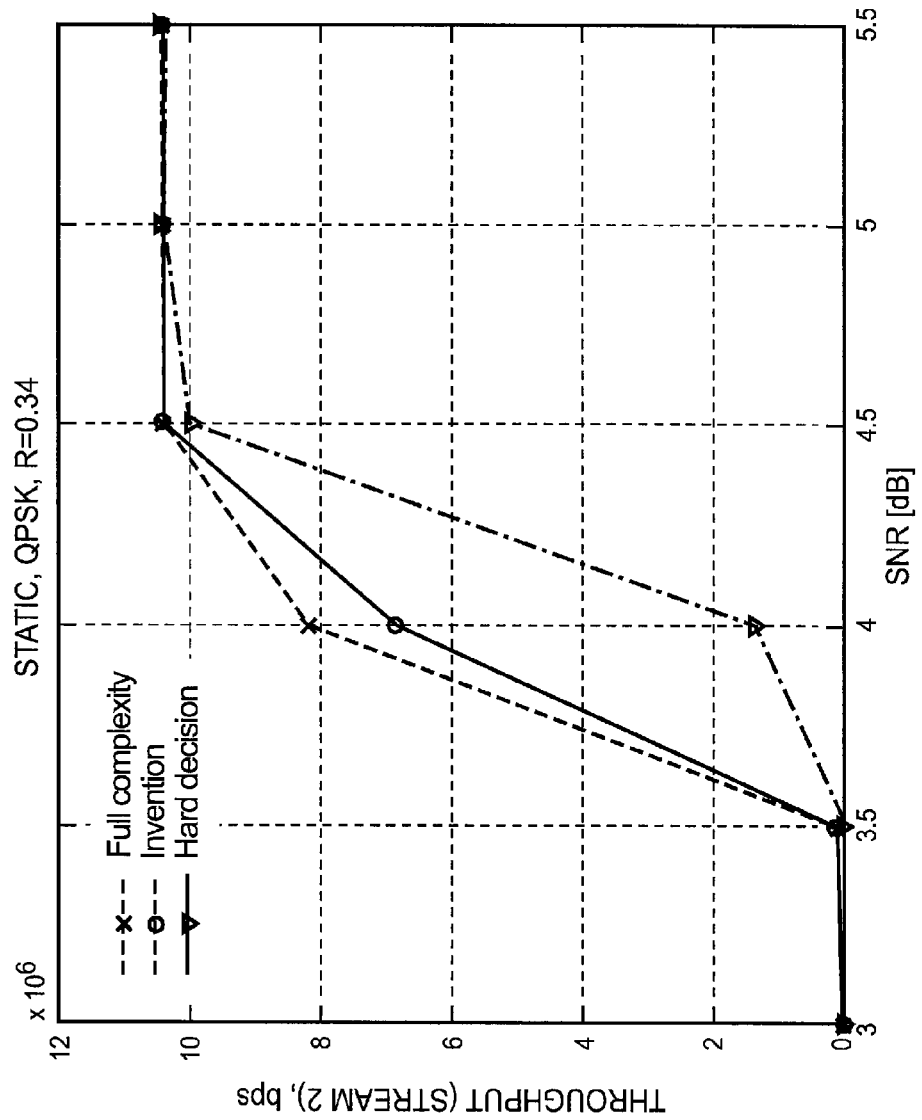
FIG. 9 is a performance diagram for an example case of interference cancellation performance, as based on an expected symbol value computation method presented herein.

FIG. 9 illustrates a comparative performance example, where interference cancellation performance using the simplified expected symbol value computation taught herein is compared with that of full-complexity exact expected symbol value computation. Particularly, FIG. 9 illustrates data throughput over a static channel with the shown transfer matrix with different forms of successive interference cancellation. The rightmost curve indicates throughput where SIC is based on making hard symbol decisions for the interfering signal; the middle curve illustrates throughput using simplified expected symbol value computations as taught herein for the interfering signal; and the leftmost curve indicates throughput where SIC is based on full-complexity expected symbol value estimation for the interfering signal. One can see that the reduced-complexity method proposed herein gains significantly over the hard decision method and achieves performance very close to the full-complexity method, at a small fraction of its computational complexity.

Of course, the method taught herein is adaptable to a variety of receiver structures. The composite signal can be a stage input signal to any one stage in a successive interference cancellation receiver circuit or in a parallel interference cancellation circuit, such that the method taught herein comprises canceling interference from one or more desired symbols of interest for that stage, with respect to one or more interfering symbols for that stage. It should also be understood that the teachings presented herein apply to a range of signal types. In one example, the composite signal is a received multiple-input-multiple-output, MIMO, signal, or is derived from a received MIMO signal that includes one or more streams of desired symbols and one or more streams of interfering symbols.

It also should be noted that the soft bit information on all bits $\lambda_m$ may be used internally for symbol decoding, e.g., in the (Turbo) decoder 134 shown in FIG. 7, to refine information bit estimates. (A typical Turbo decoder implementation reports hard decisions on the information bits at its output. However, soft information for the systematic bits is available internally in the Turbo decoder and only needs to be output via an additional interface, such as shown between the decoder 134 and the IC receiver circuit 70 in FIG. 7.) Bit log-likelihood ratios also can be computed in a Turbo decoder for the parity bits, and output via a similar interface; the additional computational load in the Turbo decoder to accomplish this parity bit processing is not prohibitive. As an alternative, an approximate method for estimating the parity bit soft information may be used that requires no computational increase in the Turbo decoder. For example, refer to the copending and commonly assigned patent application, entitled "Parity Bit Soft Estimation Method and Apparatus," as filed on 6 Oct. 2008 and assigned application Ser. No. 12/245,963.

Also, those skilled in the art may note that, for the Max-Log-MAP Turbo decoder, a simplified log-likelihood generation routine is often used, where the bit log-likelihood values have magnitudes not reflecting the SIR of the propagation environment. Use of expected symbol values for interference cancellation, including the usage taught herein, generally should be based on underlying soft value information, e.g., the unclassified bit log-likelihood ratios, that have correct absolute magnitudes. To scale the unclassified bit log-likelihood ratios so that their magnitudes are correct in an absolute (signal quality) sense, the receiver 16 may be configured to apply a scaling dependent on the signal-to-interference ratio (SIR) estimated for the composite signal. This scaling may be done e.g. as $$\lambda_m = c \frac{1}{SIR} \lambda_m^{orig}, \qquad \text{Eq. (10)}$$

where the factor c depends on how the original log-likelihood ratios are computed, and where the suffix "orig" is used here to denote the unclassified log-likelihood ratios originally determined for the interfering symbols.

Broadly, the teachings herein are not limited to QAM or other symmetric modulation constellations, nor are these teachings limited to IC receiver contexts. Indeed, the simplified expected symbol value computation taught herein may be used in a variety of circumstances where expected symbol values are used. Further, it should be understood that these teachings apply directly to a wide range of receiver types and to a wide range of communication signal types.

In an example embodiment and with reference back to FIG. 1, the network 20 is a Wideband-CDMA (WCDMA) network, and the base station 10 is configured as a WCDMA base station. In another embodiment, the base station 10 is configured as a Long Term Evolution (LTE) base station. The mobile stations 12, 13, and 15 are correspondingly configured, and thus may be WCDMA or LTE devices, or may be compatible with more than one standard/protocol. Of course, these embodiments are given as non-limiting examples, and the term "mobile station" should be given broad construction herein. Non-limiting examples of a mobile station include cellular radiotelephones, smart-phones and PDAs, palmtop/laptop computers, network interface cards, etc.

As such, the present invention is not limited to the foregoing discussion and accompanying drawings. Instead, the present invention is limited only by the following claims and their legal equivalents.

What is claimed is:

1. A method of computing expected symbol values for symbols in a received communication signal, said symbols corresponding to a predetermined constellation of candidate symbols and said method comprising:
generating soft bit information for individual bits of each symbol;
classifying the soft bit information generated for each bit of each symbol as being reliable or unreliable;
computing an expected symbol value for each symbol that has reliable soft bit information for at least one of its bits by summing those candidate symbols whose relevant bit values agree with the reliable soft bit information, and scaling the sum by a scaling factor proportional to the number of bits in the symbol that have reliable soft bit information.

2. The method of claim 1, wherein the received communication signal comprises a composite signal that includes interfering symbols as said symbols for which the expected symbol values are computed and further includes desired symbols, and wherein the method further comprises canceling interference from the composite signal based on subtracting the expected symbol values from the composite signal to obtain a reduced-interference signal, and detecting the desired symbols from the reduced-interference signal.

3. The method of claim 2, wherein said subtracting the expected symbol values from the composite signal to obtain a reduced-interference signal includes channelizing the expected symbol values before subtracting them from the composite signal.

4. The method of claim 2, wherein the composite signal is a stage input signal to one stage in a successive or parallel interference cancellation receiver circuit, such that canceling interference from the composite signal comprises canceling interference from one or more desired symbols of interest for that stage, with respect to one or more interfering symbols.

5. The method of claim 2, further comprising setting the expected symbol value to zero for any given interfering symbol that has no reliable soft bit information, such that interference cancellation is nil for the given interfering symbol.

6. The method of claim 1, wherein said generating soft bit information for individual bits of each symbol comprises generating a bit log-likelihood ratio for each bit of the symbol.

7. The method of claim 6, wherein said classifying the soft bit information for each bit of a symbol as being reliable or unreliable comprises comparing a magnitude of the bit log-likelihood ratio to a defined reliability threshold and correspondingly classifying the bit log-likelihood ratio as unreliable if its magnitude is below the defined reliability threshold and reliable if its magnitude is above the defined reliability threshold.

8. The method of claim 7, wherein said computing expected symbol values in claim 1 based on said summing and scaling represents a simplified calculation of expected value as compared to an exact expected value calculation that uses probability-weighted sums of all candidate symbols in the predetermined modulation constellation, and wherein the defined reliability threshold is set to a numeric value that minimizes a deviation in calculation results obtained using the simplified calculation for a hypothetical symbol set and calculation results obtained using the exact expected value calculation.

9. The method of claim 7, wherein said computing expected symbol values in claim 1 based on said summing and scaling represents a simplified calculation of expected value as compared to an exact expected value calculation that uses probability-weighted sums of all candidate symbols in the predetermined modulation constellation, and wherein the defined reliability threshold is set to a numeric value that yields approximately the same average power for expected symbol values as calculated using the simplified calculation for a hypothetical symbol set and as calculated using the exact expected value calculation.

10. The method of claim 7, wherein a numeric value of the defined reliability threshold is dependent on one or more characteristics of the predetermined modulation constellation, such that different numeric values of the defined threshold are used for different predetermined modulation constellations.

11. The method of claim 1, further comprising obtaining the soft bit information from a pre-decoding process, wherein the soft bit information for the symbols is determined in advance of any decoding processing performed on the symbols.

12. The method of claim 1, further comprising obtaining the soft bit information from a decoding process, wherein the soft bit information for the symbols is determined after or in conjunction with decoding the symbols.

13. The method of claim 1, wherein said computing an expected symbol value for each symbol that has reliable soft bit information for at least one of its bits by summing those candidate symbols whose relevant bit values agree with the reliable soft bit information, and scaling the sum by a scaling factor proportional to the number of bits in the symbol that have reliable soft bit information includes determining the scaling factor as $2^m/L$, where "m" is an integer equaling the number of bits in the symbol that have reliable soft bit information, and "L" is an integer equaling the number of candidate symbols in the predetermined modulation constellation.

14. The method of claim 1, wherein the received communication signal comprises a received multiple-input-multiple-output, MIMO, signal that includes one or more streams of desired symbols and one or more streams of interfering symbols, or is derived from such a MIMO signal, and wherein said expected symbol values are computed for the interfering symbols for interference cancellation with respect to the desired symbols.

15. A wireless communication receiver comprising:
an interference-cancelling receiver circuit configured to generate soft bit information for individual bits of each of one or more symbols in a received communication signal, said symbols corresponding to a predetermined constellation of candidate symbols;
a classification circuit configured to classify the soft bit information for each bit of each symbol as being reliable or unreliable; and
an expected symbol value computation circuit configured to compute an expected symbol value for each symbol that has reliable soft bit information for at least one of its bits by summing those candidate symbols whose relevant bit values agree with the reliable soft bit information, and scaling the sum by a scaling factor proportional to the number of bits in the symbol that have reliable soft bit information.

16. The wireless communication receiver of claim 15, wherein the received communication signal comprises a composite signal that includes interfering symbols and desired symbols, and wherein said symbols for which the expected symbol values are computed are the interfering symbols and said interference-canceling receiver circuit is further configured to cancel interfering symbol interference in the composite signal by subtracting the expected symbol values from the composite signal to obtain a reduced-interference signal, and wherein the wireless communication receiver is further configured to detect the desired symbols from the reduced-interference signal.

17. The wireless communication receiver of claim 16, wherein the interference-canceling receiver circuit comprises a channelization circuit configured to channelize the expected symbol values, and a subtraction circuit configured to cancel the interfering symbol interference in the composite signal subtracting the channelized expected symbol values from the composite signal.

18. The wireless communication receiver of claim 16, wherein the interference-canceling receiver circuit is configured to channelize the expected symbol values before subtracting them from the composite signal.

19. The wireless communication receiver of claim 16, wherein the wireless communication receiver comprises a successive or parallel interference cancellation receiver circuit, and wherein the composite signal is a stage input signal to one stage in the successive or parallel interference cancellation receiver circuit.

20. The wireless communication receiver of claim 16, wherein the wireless communication received is further configured to set the expected symbol value to zero for any given interfering symbol that has no reliable soft bit information, such that interference cancellation is nil for that given interfering symbol.

21. The wireless communication receiver of claim 15, wherein the interference-canceling receiver circuit is configured to generate the soft bit information for individual bits of each symbol by generating a bit log-likelihood ratio for each bit of the symbol.

22. The wireless communication receiver of claim 21, wherein the classification circuit is configured to classify the soft bit information for each bit of each symbol as being reliable or unreliable by comparing a magnitude of the bit log-likelihood ratio to a defined reliability threshold and correspondingly classify the bit log-likelihood ratio as unreliable if its magnitude is below the defined reliability threshold and reliable if its magnitude is above the defined reliability threshold.

23. The wireless communication receiver of claim 22, wherein the wireless communication receiver sets the defined reliability threshold to a numeric value that is dependent on one or more characteristics of the predetermined modulation constellation, and stores different numeric values of the defined threshold for use with different predetermined modulation constellations.

24. The wireless communication receiver of claim 15, wherein the wireless communication receiver is configured to obtain the soft bit information using a pre-coding process, wherein the soft bit information for the symbols is determined in advance of any decoding processing performed on the symbols.

25. The wireless communication receiver of claim 15, wherein the wireless communication receiver is configured to obtain the soft bit information using a decoding process, wherein the soft bit information for the symbols is determined after or in conjunction with decoding the symbols.

26. The wireless communication receiver of claim 15, wherein the wireless communication receiver is configured to compute the scaling factor used in computing the expected symbol value for any given one of the symbols that has reliable soft bit information as $2^m/L$, where "m" is an integer equaling the number of bits in the symbol that have reliable soft bit information, and "L" is an integer equaling the number of candidate symbols in the predetermined modulation constellation.

27. The wireless communication receiver of claim 15, wherein the received communication signal is a received multiple-input-multiple-output, MIMO, signal that includes one or more streams of desired symbols and one or more streams of interfering symbols, or is derived from such a MIMO signal, and wherein the wireless communication receiver comprises a MIMO receiver and the expected symbol value computation circuit is configured to compute the expected symbol values for the interfering symbols and to use the expected symbol values to cancel interfering symbol interference with respect to the desired symbols.

28. The wireless communication receiver of claim 15, wherein the received communication signal includes interfering symbols as said symbols and further includes desired symbols, and wherein the classification circuit is further configured to classify the soft bit information generated for the interfering symbols as reliable or unreliable, wherein the expected symbol value computation circuit is further configured to compute the expected symbol values of the interfering symbols having reliable soft bit information, replaced by and wherein the interference cancellation circuit is further configured to subtract the expected symbol values computed for the interfering symbols having reliable soft bit information from the composite signal.

29. A method of canceling interference for a composite signal that includes desired symbols and interfering symbols, said interfering symbols corresponding to a predetermined constellation of candidate symbols, said method comprising:
classifying soft bit information generated for each bit of an interfering symbol as being reliable or unreliable;
generating expected symbol values for the interfering symbols based on the classified soft bit information and canceling interference from the composite signal based on the expected symbol values;
wherein, for each interfering symbol having reliable soft bit information, computing its expected symbol value by identifying those candidate symbols having bit values that are not inconsistent with the reliable soft bit information, summing the identified candidate symbols, and scaling the sum by a scaling factor that is proportional to the number of bits in the interfering symbol that have reliable soft bit information; and
wherein, for each interfering symbol value having only unreliable soft bit information, computing its expected symbol value as zero.

* * * * *

UNITED STATES PATENT AND TRADEMARK OFFICE
CERTIFICATE OF CORRECTION

| | |
|---|---|
| PATENT NO. | : 8,315,342 B2 |
| APPLICATION NO. | : 12/252860 |
| DATED | : November 20, 2012 |
| INVENTOR(S) | : Reial |

It is certified that error appears in the above-identified patent and that said Letters Patent is hereby corrected as shown below:

In Column 16, Line 64, in Claim 17, delete "subtracting" and insert -- by subtracting --, therefor.

Signed and Sealed this
Nineteenth Day of February, 2013

Teresa Stanek Rea
*Acting Director of the United States Patent and Trademark Office*